F. A. BISHOP.
Nut-Locks.
No. 133,694.
Patented Dec. 10, 1872.
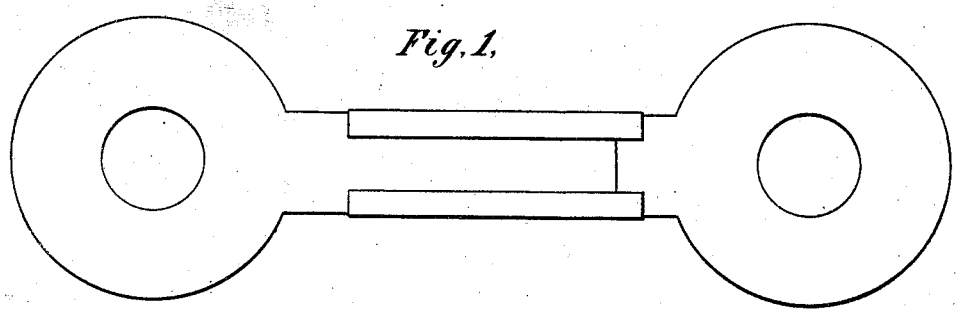
Fig. 1.
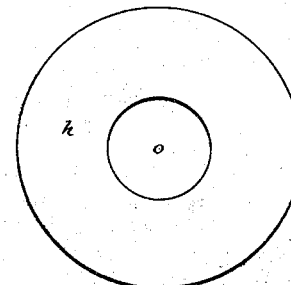
Fig. 2.
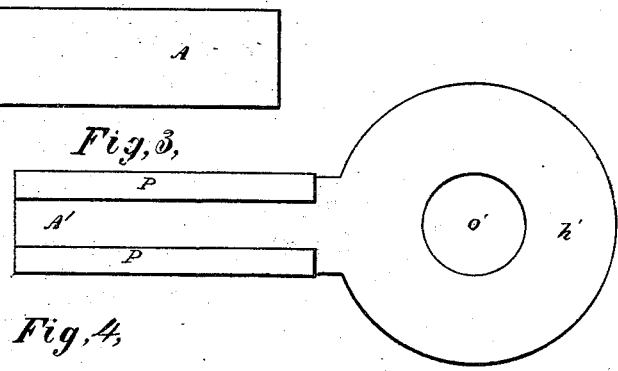
Fig. 3.
Fig. 4.
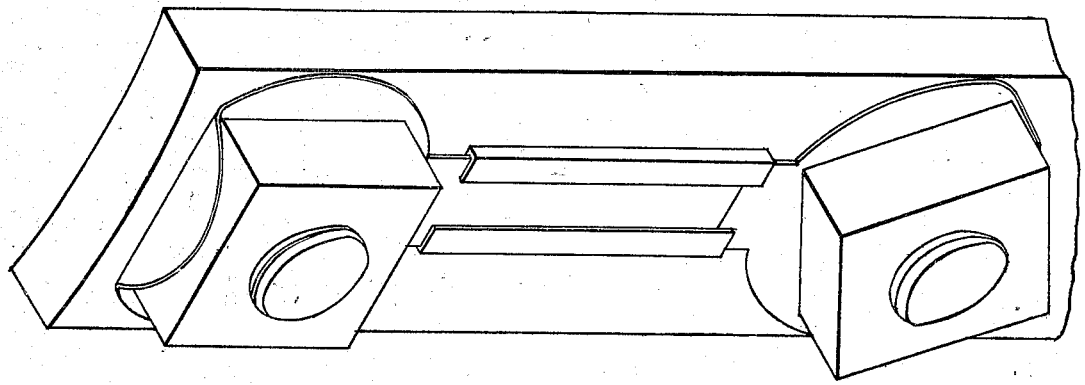
Witnesses.
George Barker
W. G. Hall
Inventor.
Francis A. Bishop

UNITED STATES PATENT OFFICE.

FRANCIS A. BISHOP, OF SHINGLE SPRINGS, CALIFORNIA.

IMPROVEMENT IN NUT-LOCKS.

Specification forming part of Letters Patent No. 133,694, dated December 10, 1872; antedated December 4, 1872.

To all whom it may concern:

Be it known that I, FRANCIS A. BISHOP, of Shingle Springs, El Dorado county, State of California, have invented a new and Improved Nut-Lock; and I hereby declare that the following is a full, clear, and exact description thereof, which will enable others skilled in the art to make and use the same, reference being had to the accompanying drawing forming part of this specification, in which—

Figure 1 is the plan of my invention; Fig. 2 is the plan of the bar A with the circular head $h$; Fig. 3 is the plan of the bar A' with the turned-over lips $p\ p$ and circular head $h'$; and Fig. 4 is a perspective view of the invention in position upon a fish-plate of railroad track.

The invention relates to a new and improved nut-lock for keeping the nuts on screw-bolts in adjustment. The object of this invention is to obtain a lock which will securely retain the nuts of screw-bolts at such positions on their respective bolts as may be desired, when such bolts are contiguous to each other, or situated similarly to those employed in the fastening in railroad tracks.

A represents a bar of sheet metal of suitable dimensions, having a circular head, $h$, the said head containing a bolt-hole, $o$, as shown in drawing, Fig. 2. A', Fig. 3, represents a similar bar and head as first described, except the turned-over lips $p\ p$, which form grooves, and permit the sliding of one bar upon the other. The sliding together of the parts A A', as shown in Fig. 1, essentially completes the lock. The parts thus joined to each other are placed upon a fish-plate or other location, the bolts passing through the holes $o\ o'$, and the nuts are then screwed down upon the heads. A part of the respective heads $h\ h'$ is upset or turned closely up against a side of each nut, as shown in Fig. 4, thus presenting an obstacle which prevents the unscrewing of the nut, while the lock itself is kept from rotating because of its location upon separate bolts.

By this arrangement it will be seen that nuts in pairs may be secured to their places on bolts against concussions or jarrings of the structure wherein they are used, or against any strain less than that sufficient to flatten the heads $h\ h'$ to their normal condition. The circular form of the heads allows the reusing of the lock many times, should the loosening and tightening of the nuts require it; or it may be turned up upon three sides of a square nut at once, if found necessary.

Having thus described my invention, I disclaim the various parts and mechanical devices constituting my apparatus when separately considered, and when not combined as set forth. I also disclaim the turning up of a piece of thin metal against the side of a nut; but

I do claim as new and desire to secure by Letters Patent—

The head $h$ having the bar A, in combination with the head $h'$ and lipped bar A', as and for the purpose described.

FRANCIS A. BISHOP.

Witnesses:
   D. S. COOK,
   D. S. BRYANT.